(12) United States Patent
Bento

(10) Patent No.: US 6,604,547 B1
(45) Date of Patent: Aug. 12, 2003

(54) DOUBLE VALVE WITH CROSS EXHAUST

(75) Inventor: Jose Carlos Bento, Sao Paulo (BR)

(73) Assignee: Ross Operating Valve Company, Troy, MI (US)

( * ) Notice: Subject to any disclaimer, the term of this patent is extended or adjusted under 35 U.S.C. 154(b) by 12 days.

(21) Appl. No.: 10/079,926

(22) Filed: Feb. 19, 2002

(51) Int. Cl.⁷ ............................................. F15B 20/00
(52) U.S. Cl. ................................... 137/596.16; 91/424
(58) Field of Search ...................... 91/424; 137/596.16

(56) References Cited

U.S. PATENT DOCUMENTS

| | | | | |
|---|---|---|---|---|
| 5,927,324 A | * | 7/1999 | Russell et al. | 137/596.16 |
| 6,155,293 A | * | 12/2000 | Haselden et al. | 137/596.16 |
| 6,478,049 B2 | * | 11/2002 | Bento et al. | 137/596.16 |

* cited by examiner

Primary Examiner—Gerald A. Michalsky
(74) Attorney, Agent, or Firm—Harness, Dickey & Pierce, PLC

(57) ABSTRACT

A control Valve system having a housing defining a first inlet, a second inlet, a first outlet, a second outlet, and an exhaust to define an intrinsically safe double valve. The double control valve system of the present invention further includes a pair of cross exhaust passages that eliminates the need for complicated timing devices.

9 Claims, 3 Drawing Sheets

DOUBLE VALVE WITH CROSS EXHAUST

FIELD OF THE INVENTION

The present invention relates to control valves and, more particularly, relates to a double valve having a cross exhaust capable of replacing two separate valves.

BACKGROUND OF THE INVENTION

Machine tools of various types operate through a valving system, which interacts with a pneumatically controlled clutch and/or brake assembly. For safety reasons, the control valves that are used to operate these machine tools require the operator to actuate two separate control signal applying contacts essentially simultaneously. This requirement of simultaneous application ensures that the operator will not have his hand near the, moving components of the machine tool when an operating cycle is initiated. The two-control signal applying contacts can then be connected to the valving system that allows compressed air to be delivered to the machine tool to perform its operating cycle.

Safety rules and regulations require the valving system to be designed such that if a component in the valving system malfunctions, the valving system will not allow additional movement of the machine tool. In addition, the valving system must ensure that a new operation cycle of the machine tool cannot be initiated after a component of the valving system has become defective.

Prior art electromagnetic valving systems, which are utilized for the operation of machine tools, meet these safety requirements through the use of a double valve assembly. The double valve assembly includes two electromagnetic supply valves that are normally closed. Each of the supply valves is moved to an open position in response to an electrical control signal. The two supply valves are arranged in series with respect to the source of compressed air.

The double valve assembly also includes two exhaust valves, which are normally open. Each exhaust valve is closed by a respective supply valve when it is opened. It is therefore necessary for the supply valves to be opened simultaneously, otherwise supply air will be exhausted from the system through one of the exhaust valves. The opening and closing of the valve units is monitored by sensing air pressures in the respective valve units and then comparing these two pressures. The monitoring and comparing of these two pressures are accomplished by using a single air cylinder that is separated into two chambers by a piston. The pressure in each valve unit is delivered to one of the chambers. Thus, unequal pressures in the valve units will cause movement of the normally static piston, which will then interrupt the electrical signal to one of the valve units. This and other external electronic monitoring arrangements are expensive and require that electrical signal processing equipment be designed and utilized.

The continued development of the valving systems for machine tools has been directed toward more reliable, simpler, and less costly valving systems that both meet and exceed the safety performance requirements in force today as well as those proposed for the future.

SUMMARY OF THE INVENTION

According to the principles of the present invention, a control valve system is provided that includes a housing defining a first inlet, a second inlet, a first outlet, a second outlet, and an exhaust to define an intrinsically safe double valve. The double control valve system of the present invention further includes a pair of cross exhaust passages that eliminates the need for complicated timing devices.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
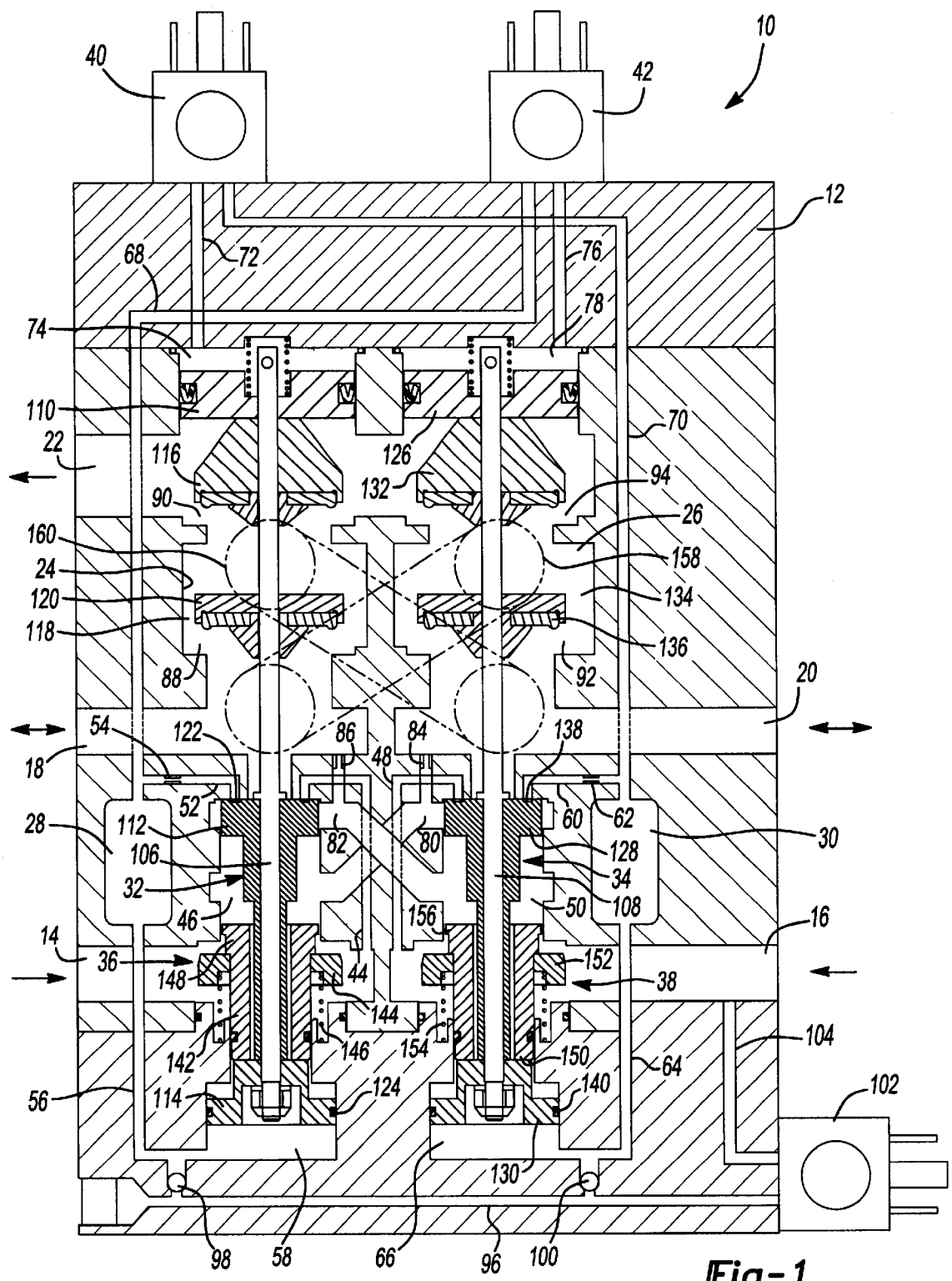
FIG. 1 is a cross-sectional view of the control valve system shown in its normal position ready for operation.
Figure 2:
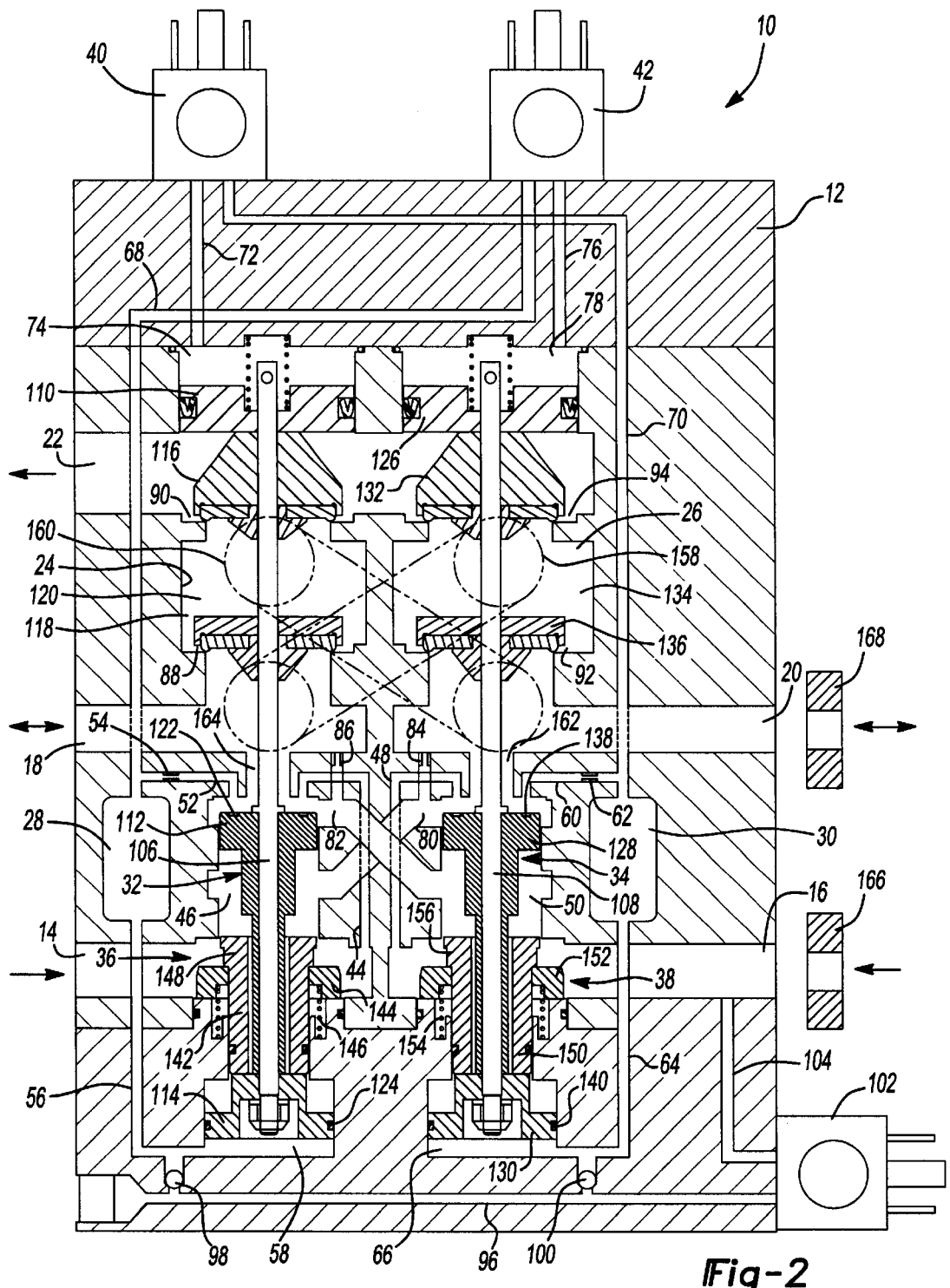
FIG. 2 is a cross-sectional view of the control valve system shown in value system shown in its fully operated position with the outlet being fully pressurized; and, FIG. 3 is a cross-sectional view of the control valve system shown in an abnormal position.
Figure 3:
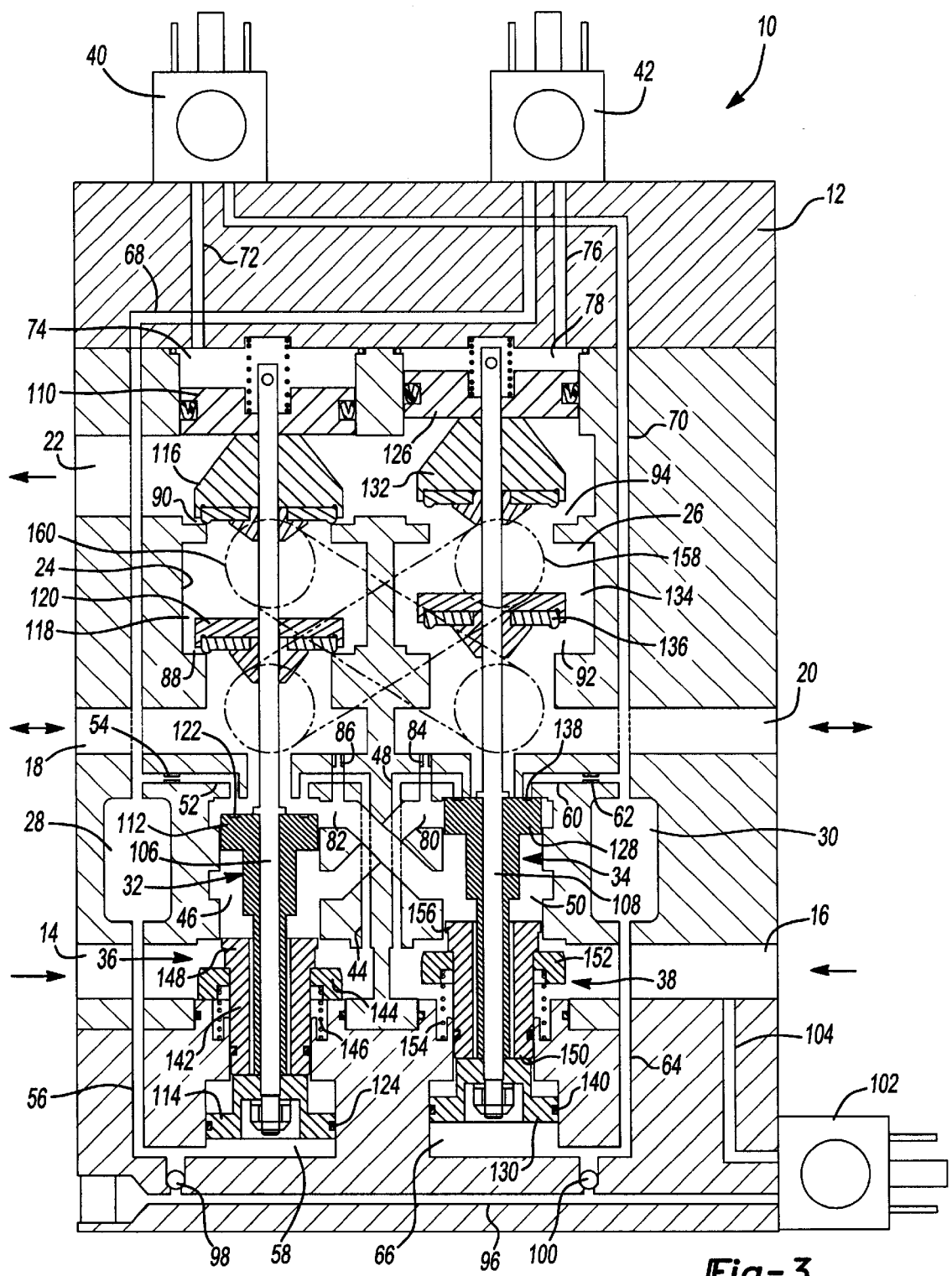

Referring now to the drawings in which like reference numerals designate like or corresponding parts throughout the several views, there is shown in FIGS. 1–3 a control valve system in accordance with the present invention, which is designated generally by the reference numeral 10. Control valve system 10 is shown as a fluid control valve.

Referring to FIG. 1, control valve system 10 comprises a housing 12 having a first fluid inlet fluid passage 14, a second fluid inlet fluid passage 16, a first fluid first outlet fluid passage 18, a second fluid outlet fluid passage 20, a fluid exhaust fluid passage 22, a first valve bore 24, a second valve bore 26, a first fluid reservoir 28, and a second fluid reservoir 30. Disposed within first valve bore 24 is a first valve member 32 and disposed within second valve bore 26 is a second valve member 34. Located within first inlet fluid passage 14 in a coaxial relationship with first valve member 32 is a third valve member 36. Located within second inlet fluid passage 16 in a coaxial relationship with second valve member 34 is a fourth valve member 38. A pair of solenoid valves 40 and 42 is attached to housing 12.

A plurality of fluid passages interconnect valve bores 24 and 26 with first inlet fluid passage 14, second inlet fluid passage 16, first outlet fluid passage 18, second outlet fluid passage 20, exhaust fluid passage 22, first fluid reservoir 28, second reservoir 30, third valve member 36, and fourth valve member 38. A fluid passage 44 extends between first inlet fluid passage 14 and an intermediate chamber 46 formed by first valve bore 24. A fluid passage 48 extends between second inlet fluid passage 16 and an intermediate chamber 50 formed by second valve bore 26.

A fluid passage 52 extends between intermediate chamber 46 and first reservoir 28. A restrictor 54 is disposed within fluid passage 52 to limit the amount of fluid flow through fluid passage 52. Additionally, a fluid passage 56 extends between first reservoir 28 and a lower chamber 58 formed by first valve bore 24. Similarly, a fluid passage 60 extends between intermediate chamber 50 and second reservoir 30.

A restrictor 62 is disposed within fluid passage 60 to limit the amount of fluid flow through fluid passage 60. Additionally, a fluid passage 64 extends between second reservoir 30 and a lower chamber 66 formed by second valve bore 26.

Furthermore, a fluid passage 68 extends between fluid passage 52 and the input to solenoid valve 42. A fluid passage 70 extends between fluid passage 60 and the input to solenoid valve 40. A fluid passage 72 extends between the output of solenoid valve 40 and an upper chamber 74 formed by first valve bore 24. A fluid passage 76 extends between the output of solenoid valve 42 and an upper chamber 78 formed by second valve bore 26.

A cross passage 80 extends between the lower portion of intermediate chamber 46 and the upper portion of intermediate chamber 50. A cross passage 82 extends between the lower portion of intermediate chamber 50 and the upper portion of intermediate chamber 46. A fluid passage 84 extends between cross passage 8O and second outlet fluid passage 20. A fluid passage 86 extends between cross passage 82 and first outlet fluid passage 18.

First outlet fluid passage 18 is in communication with exhaust fluid passage 22 through a lower port 88 and an upper port 90. Similarly, second outlet fluid passage 20 is in communication with exhaust fluid passage 22 through a lower port 92 and an upper port 94. A reset fluid passage 96 extends into housing 12 and is in communication with the lower portions of lower chamber 58 and lower chamber 66 by communicating with fluid passage 56 and fluid passage 64, respectively. A pair of check valves 98 and 100 are disposed between reset fluid passage 96 and fluid passage 56 and fluid passage 64, respectively, to prohibit fluid flow between fluid passage 56 or fluid passage 64 to reset fluid passage 96, but allow fluid flow from reset fluid passage 96 to one or both fluid passages 56 and 64. A reset solenoid 102 is further provided in communication with a supply inlet fluid passage 104 from second inlet fluid passage 16 and reset fluid passage 96.

A first valve body or member 106 is disposed within first valve bore 24 and a second valve body or member 108 is disposed within second valve bore 26. First valve member 106 comprises an upper piston 110, an intermediate piston 112, and a lower piston 114, all of which move together as a single unit. Upper piston 110 is disposed within upper chamber 74 and includes a first valve seat 116 that opens and closes upper port 90 located between an intermediate chamber 118 of first valve bore 24 and exhaust fluid passage 22. Upper piston 110 further includes a second valve seat 120 that opens and closes lower port 88 located between first outlet fluid passage 18 and intermediate chamber 118.

Intermediate piston 112 is disposed within intermediate chamber 46 and includes an annular fluid passage 122 which fluidly connects fluid passage 44 to fluid passage 52 when intermediate piston 112 is seated against housing 12.

Lower piston 114 is located within lower chamber 58 and includes a seal 124 that seals lower chamber 58 from first inlet fluid passage 14.

Second valve member 108 comprises an upper piston 126, an intermediate piston 128, and a lower piston 130, all of which move together as a single unit. Upper piston 126 is disposed within upper chamber 78 and includes a first valve seat 132 that opens and closes upper port 94 located between an intermediate chamber 134 of second valve bore 26 and exhaust fluid passage 22. Upper piston 126 further includes a second valve seat 136 that opens and closes lower port 92 located between second outlet fluid passage 20 and intermediate chamber 134.

Intermediate piston 128 is disposed within intermediate chamber 50 and includes an annular fluid passage 138, which fluidly connects fluid passage 48 to fluid passage 60 when intermediate piston 128 is seated against housing 12.

Lower piston 130 is located within lower chamber 66 and includes a seal 140 that seals lower chamber 66 from second inlet fluid passage 16.

Third valve member 36 comprises an inner member 142 slidably disposed in first valve bore 24, a valve seat 144 surrounding inner member 142, and a valve spring 146. Inner member 142 includes a shoulder portion 148, which acts as a contact feature with intermediate piston 112 and a contact feature with valve seat 144. Valve spring 146 biases valve seat 144 into contact with inner member 142 and further biases valve seat 144 against housing 12 to prohibit fluid flow between first inlet fluid passage 14 and intermediate chamber 46. Inner member 142 is further capable of being in driving contact with lower piston 114.

Fourth valve member 38 comprises an inner member 150 slidably disposed in second valve bore 26, a valve seat 152 surrounding inner member 150, and a valve spring 154. Inner member 150 includes a shoulder portion 156, which acts as a contact feature with intermediate piston 128 and a contact feature with valve seat 152. Valve spring 154 biases valve seat 152 into contact with inner member 150 and further biases valve seat 152 against housing 12 to prohibit fluid flow between second inlet fluid passage 16 and intermediate chamber 50. Inner member 150 is further capable of being in driving contact with lower piston 130.

A first cross exhaust fluid passage 158 extends between first outlet fluid passage 18 and intermediate chamber 134. A second cross exhaust fluid passage 160 extends between second outlet fluid passage 20 and intermediate chamber 118. First cross exhaust fluid passage 158 and second cross exhaust fluid passage 160 permit exhausting of first outlet fluid passage 18 and second outlet fluid passage 20, respectively, in the event control valve system 10 malfunctions, thus providing an intrinsically safe valve.

OPERATION

FIG. 1 illustrates control valve system 10 in its deactuated position. Pressurized fluid from first inlet fluid passage 14 biases valve seat 144 against housing 12, thereby closing communication between first inlet fluid passage 14 and intermediate chamber 46. Upon actuation of reset solenoid 102, pressurized fluid from first inlet fluid passage 14 is provided to fluid passage 44, to fluid passage 52 through annular fluid passage 122, through restrictor 54 and first reservoir 28, and into lower chamber 58 to bias first valve member 106 upward to seat intermediate piston 12 against housing 12. Pressurized fluid also flows through fluid passage 52 and through fluid passage 68 to the inlet of solenoid valve 42.

In a similar manner, pressurized fluid from second inlet fluid passage 16 biases valve seat 152 against housing 12, thereby closing communication between second inlet fluid passage 16 and intermediate chamber 50. Furthermore, pressurized fluid from second inlet fluid passage 16 is provided to fluid passage 48, to fluid passage 60 through annular fluid passage 138, through restrictor 62 and second reservoir 30, and into lower chamber 66 to bias second valve member 108 upward to seat intermediate piston 128 against housing 12. Pressurized fluid also flows through fluid passage 60 and through fluid passage 68 to the inlet of solenoid valve 40.

First outlet fluid passage 18 and second outlet fluid passage 20 are in communication with exhaust fluid passage 22 due to second valve seat 120 and first valve seat 116 being biased upward opening lower port 88 and upper port 90, respectively, and second valve seat 136 and first valve seat 132 being biased upward opening lower port 92 and upper port 94, respectively. Furthermore, first outlet fluid passage 18 is in communication with intermediate chamber 134 through first cross exhaust fluid passage 158 and second outlet fluid passage 20 is in communication with intermediate chamber 118 through second cross exhaust fluid passage 160. Intermediate chamber 46 and intermediate chamber 50 are also open to exhaust fluid passage 22 through cross passages 80 and 82, respectively, through fluid passages 84 and 86, respectively. The fluid pressure below upper piston 110 and upper piston 126 of first valve member 106 and second valve member 108, respectively, bias first valve member 106 and second valve member 108 upward maintaining control valve system 10 in the deactuated position. The connection between fluid passage 44 and fluid passage 52 through annular fluid passage 122 and the connection between fluid passage 48 and fluid passage 62 through annular fluid passage 138 maintain fluid pressure within lower chamber 58 and lower chamber 66 and first reservoir 28 and second reservoir 30.

FIG. 2 illustrates control valve system 10 in its actuated position. Both solenoid valve 40 and solenoid valve 42 have been substantially simultaneously actuated. The actuation of solenoid valve 40 connects fluid passage 70 to fluid passage 72. Pressurized fluid is directed into upper chamber 74 to move first valve member 106 downward. The diameter of upper piston 110 is larger than the diameter of lower piston 114, thus causing the load that moves first valve member 106 downward. In a similar manner, the actuation of solenoid valve 42 connects fluid passage 68 an to fluid passage 76. Pressurized fluid is directed into upper chamber 78 to move second valve member 108 downward. The diameter of upper piston 126 is larger than the diameter of lower piston 130, thus causing the load that moves second valve member 108 downward. When first valve member 106 moves downward, intermediate piston 112 contacts and drives downward inner member 142 of third valve member 36, thereby causing shoulder portion 148 to unseat valve seat 144. Similarly, second valve member 108 unseats valve seat 152.

Pressurized fluid flows from first inlet fluid passage 14 into the lower portion of intermediate chamber 46, through cross passage 80 to the upper portion of intermediate chamber 50, and through a gap 162 between second valve member 108 and housing 12 to provide pressurized fluid to second outlet fluid passage 20. Pressurized fluid from first inlet fluid passage 14 also flows through fluid passage 84 to second outlet fluid passage 20.

In a similar manner, pressurized fluid flows from second inlet fluid passage 16 into the lower portion of intermediate chamber 50, through cross passage 82 to the upper portion of intermediate chamber 46, and through a gap 164 between first valve member 106 and housing 12 to provide pressurized fluid to first outlet fluid passage 18. Pressurized fluid from second inlet fluid passage 16 also flows through fluid passage 86 to first outlet fluid passage 18.

The movement of first valve member 106 and second valve member 108 downward seats valve seats 116 and 120 and valve seats 132 and 136 against housing 12 to close ports 88 and 90 and ports 92 and 94 to isolate first outlet fluid passage 18 from exhaust fluid passage 22 and second outlet fluid passage 20 from exhaust fluid passage 22. It should be recognized that this arrangement further seals first cross exhaust fluid passage 158 from venting first outlet fluid passage 18 and second cross exhaust fluid passage 160 from venting second outlet fluid passage 20. The fluid pressure within first reservoir 28 and reservoir 30 will initially be reduced when solenoid valve 40 and solenoid valve 42 are actuated but the fluid pressure will return to the supply pressure of first inlet fluid passage 14 and second inlet fluid passage 16.

Still referring to FIG. 2, control valve system 10 optionally includes a pair of washers or restrictors 166 and 168. Specifically, inlet washer 166 is disposed within the fluid path of inlet fluid passage 16. Inlet washer 166 includes at least one through orifice that is sized to restrict inlet flow. Similarly, outlet washer 168 is disposed within the fluid path of outlet fluid passage 20. Outlet washer 168 similarly includes at least one through orifice that is sized to restrict outlet flow. More particularly, the through orifices of inlet washer 166 and outlet washer 168 are sized to establish an overlap adjustment or timing setting. For example, this overlap adjustment preferably enables the disengagement of a brake member prior to engagement of a clutch member and vice versa to prevent unnecessary wear on the machine. Because of the timing capability of this washer arrangement, it is possible to eliminate the need for a check valve to prevent backflows.

FIG. 3 illustrates control valve system 10 in an abnormal position. Second valve member 108 is located in its upward position while first valve member 106 is located in its lower position. Both solenoid valve 40 and solenoid valve 42 are located in their deactuated position. Pressurized fluid from second inlet fluid passage 16 is provided to fluid passage 48, to fluid passage 60 through annular fluid passage 138, through restrictor 62 and second reservoir 30, and into lower chamber 66 to bias second valve member 108 upward to seat intermediate piston 128 against housing 12. Pressurized fluid also flows through fluid passage 60 and through fluid passage 68 to the inlet of solenoid valve 40 through fluid passage 70. Second outlet fluid passage 20 is in communication with exhaust fluid passage 22 due to second valve seat 136 and first valve seat 132 being biased upward opening lower port 92 and upper port 94, respectively.

First valve member 106 is located in its lower position which opens various fluid passages to first outlet fluid passage 18, which because second cross exhaust fluid passage 160, is open to exhaust 22. The upper portion of intermediate chamber 46 is open to exhaust 22 through gap 164. Pressurized fluid from first inlet fluid passage 14 is bled to exhaust 22 through fluid passage 44 and through the upper portion of intermediate chamber 46 through gap 164, through first cross exhaust fluid passage 158, through upper port 94 to exhaust fluid passage 22. In addition, pressurized fluid from first inlet fluid passage 14 will bleed to exhaust 22 by entering the lower portion of intermediate chamber 46, flow through cross passage 80, through fluid passage 84, through second outlet fluid passage 20, through upper port 94 and into exhaust fluid passage 22. Pressurized fluid in fluid passage 52 and thus lower chamber 58 is also bled to exhaust through restrictor 54, which removes the biasing being applied to first valve member 106. A leak path also exists from first inlet fluid passage 14 to the lower portion of intermediate chamber 46 to the upper portion of intermediate chamber 46 via a gap between intermediate piston 112 and the walls of first valve bore 24. From the upper portion of intermediate chamber 46, fluid pressure may escape as described above. Yet another leak path exists from the lower portion of intermediate chamber 46 through cross passage 80, from upper portion to lower portion of intermediate chamber 50, and through cross passage 82 into upper portion of intermediate chamber 46. From the upper portion of intermediate chamber 46, fluid pressure may escape as described above. In addition, fluid pressure in first reservoir 28 is bled to exhaust through restrictor 54 removing the pressurized fluid being supplied to solenoid valve 42 through fluid passage 68. The amount of time for lower chamber 58 and first reservoir 28 to bleed to exhaust will depend upon the size of lower chamber 58, first reservoir 28, and restrictor 54. With the release of pressurized air from upper chamber 74 above upper piston 110 and the presence of pressurized air within first inlet fluid passage 14 acting against the bottom of valve seat 144, valve spring 146 will move, first valve member 106 to an intermediate position where valve seat 144 is seated against housing 12 but intermediate piston 112 is not seated against housing 12 (not shown).

When valve seat 144 urges first valve member 106 upwards due to the biasing of valve spring 146, valve seat 144 pushes against shoulder portion 148 to move first valve member 106. Because of a lost motion attachment between valve seat 144 and upper piston 110, when valve seat 144 engages housing 12, intermediate piston 112 has not yet engaged housing 12. Additional movement of first valve member 106 is required to seat intermediate piston 112 against housing 12 and connect fluid passage 44 to fluid passage 52 and provide pressurized fluid to first reservoir 28 and lower chamber 58. Without the seating of intermediate piston 112 to housing 12, the upper portion of intermediate chamber 46 and thus fluid passages 40 and 52 are open to exhaust 22 through gap 164, first cross exhaust fluid passage 158, and upper port 94. Thus, first reservoir 28 is open to exhaust along with fluid passage 68 and the input to solenoid valve 42. Lower chamber 58 is also open to exhaust, thus eliminating any biasing load that would urge first valve member 106 upward to seat intermediate piston 112 against housing 12.

When it is desired to move control valve system 10 from its locked out position to its deactuated position shown in FIG. 1, pressurized fluid is supplied to reset fluid passage 96. Pressurized fluid being supplied to reset fluid passage 96 opens check valve 98 due to the pressure differential and pressurized fluid fills first reservoir 28 and lower chamber 58. Restrictor 54 will limit the amount of fluid bled off to exhaust during the resetting procedure. Once first reservoir 28 and lower chamber 58 are filled with pressurized fluid, the fluid within lower chamber 58 acts against lower piston 114 to move first valve member 106 upward to seat intermediate piston 112 against housing 12. Fluid passage 44 is again in communication with fluid passage 52 through annular fluid passage 122 and control valve system 10 is again positioned in its deactuated position as shown in FIG. 1.

While the above description of FIGS. 1 through 3 have been described with first valve member 106 being located in its intermediate and locked out position and second valve member 108 being located in its deactuated position, it is to be understood that a similar locked out position of control valve system 10 would occur if first valve member 106 were located in its deactuated condition and second valve member 108 were located in its intermediate and locked out condition. The resetting procedure of applying pressurized fluid to reset fluid passage 96 would cause the pressurized fluid to open check valve 100 to fill second reservoir 30 and lower chamber 66. The pressurized fluid in lower chamber 66 would lift second valve member 108 to seat intermediate piston 128 against housing 12 reconnecting fluid passage 48 with fluid passage 60.

Thus, control valve system 10 is a fully fluid operating valve system that has the capability of sensing an abnormal condition and responding to this abnormal condition by switching to a locked out condition, which then requires an individual to go through a resetting operation before control valve system 10, will again function.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control valve system comprising:
    a housing defining a first inlet, a second inlet, a first outlet, a second outlet, and an exhaust;
    a first passage extending between said first inlet and said first outlet;
    a second passage extending between said second inlet and said second outlet;
    a third passage extending between said first outlet and said exhaust;
    a fourth passage extending between said second outlet and said exhaust;
    a fifth passage extending between said first outlet and said fourth passage;
    a sixth passage extending between said second outlet and said third passage;
    a first plurality of valves disposed within said first passage and said third passage, each of said first plurality of valves being movable between a deactuated position where said first and third passages are closed, an actuated position where said first and third passages are open, and an intermediate position where said first and third passages are partially open;
    a second plurality of valves disposed within said second passage and said fourth passage, each of said second plurality of valves being movable between a deactuated position where said second and fourth passages are open, an actuated position where said second and fourth passages are closed, and an intermediate position where said second and fourth passages are partially open; and
    a plurality of reset members selectively engageable with said first plurality of valves and said second plurality of valves, respectively, said plurality of reset members operable to move said first plurality of valves and said second plurality of valves to said deactuated positions when a pressure is applied to said plurality of reset members.

2. The control valve system according to claim 1, further comprising:
    a first restrictor disposed at said first inlet to limit the amount of fluid flow therethrough.

3. The control valve system according to claim 2, further comprising:
    a second restrictor disposed at said second outlet to limit the amount of fluid flow therethough, said first restrictor and said second restrictor cooperating to establish a predetermined timing configuration.

4. The control valve system according to claim 1 wherein each of said plurality of reset members comprises a piston member.

5. A control valve system comprising:
    a first inlet, a second inlet, a first outlet, a second outlet, and an exhaust;
    a first passage extending between said first inlet and said first outlet;

a second passage extending between said second inlet and said second outlet;

a third passage extending between said first outlet and said exhaust;

a fourth passage extending between said second outlet and said exhaust;

a fifth passage extending between said first outlet and said fourth passage;

a sixth passage extending between said second outlet and said third passage;

a first main valve moveable between a deactuated position where said first passage is closed, an actuated position where said third and sixth passages are closed, and an intermediate position where said third and sixth passages are partially open;

a second main valve moveable between a deactuated position where said second passage is closed, an actuated position where said fourth and fifth passages are closed, and an intermediate position where said fourth and fifth passages are partially open; and a plurality of reset members selectively engageable with said first main valve and said second main valve, respectively, said plurality of reset members operable to move said first main valve and said second main valve to said deactuated positions when a pressure is applied to said plurality of reset members.

6. The control valve system according to claim 5, further comprising:

a first restrictor disposed at said first inlet to limit the amount of fluid flow therethrough.

7. The control valve system according to claim 6, further comprising:

a second restrictor disposed at said second outlet to limit the amount of fluid flow therethrough, said first restrictor and said second restrictor cooperating to establish a predetermined timing configuration.

8. The control valve system according to claim 5 wherein each of said plurality of reset members comprises a piston member.

9. The control valve system according to claim 5, further comprising:

a return spring biasing said first main valve to said intermediate position and said second main valve to said intermediate position.

* * * * *